May 30, 1939.   P. BAUMANN ET AL   2,160,452
APPARATUS FOR THE OPERATION OF DIRECT CURRENT ELECTRIC ARCS
Filed Feb. 24, 1933   3 Sheets-Sheet 1

INVENTORS
PAUL BAUMANN
KARL KRAPP
HEINRICH SCHILLING
ROBERT STADLER
BY
ATTORNEYS.

May 30, 1939.　　　P. BAUMANN ET AL　　　2,160,452
APPARATUS FOR THE OPERATION OF DIRECT CURRENT ELECTRIC ARCS
Filed Feb. 24, 1933　　　3 Sheets-Sheet 2
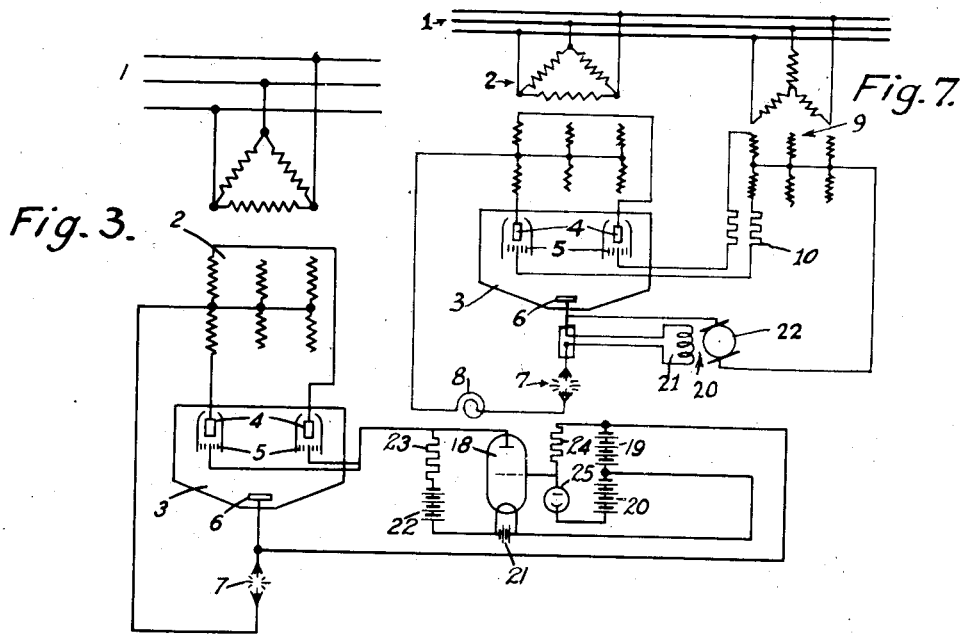
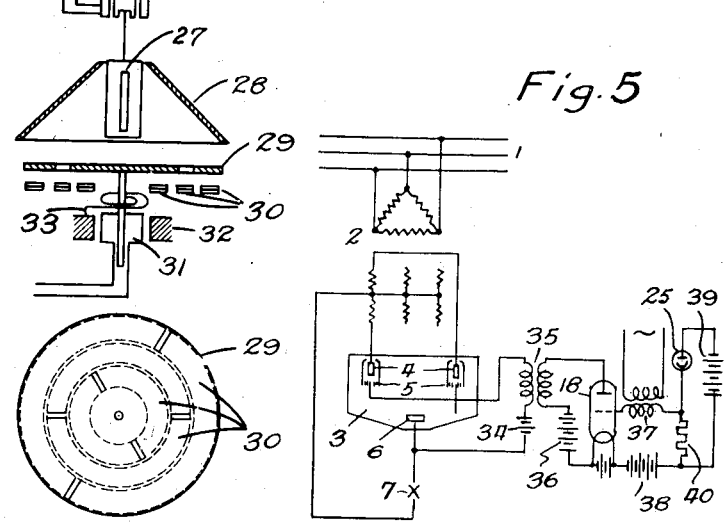
INVENTORS
PAUL BAUMANN
KARL KRAPP
HEINRICH SCHILLING
ROBERT STADLER
BY
ATTORNEYS Patented May 30, 1939

2,160,452

UNITED STATES PATENT OFFICE 2,160,452

APPARATUS FOR THE OPERATION OF DIRECT CURRENT ELECTRIC ARCS

Paul Baumann, Ludwigshafen - on - the - Rhine, Karl Krapp, Mannheim, Heinrich Schilling, Ludwigshafen-on-the-Rhine, and Robert Stadler, Ziegelhausen, Germany, assignors to I. G. Farbenindustrie Aktiengesellschaft, Frankfort-on-the-Main, Germany Application February 24, 1933, Serial No. 658,330
In Germany February 25, 1932

5 Claims. (Cl. 171—97)

The present invention relates to an apparatus for the operation of direct current electric arcs.

For the operation of direct current electric arcs, a direct tension is necessary which decreases strongly with increasing current and which follows a sudden change in current without retardation or practically without retardation. The attainment of such a tension characteristic necessitates high operating and plant costs no matter whether an energy-consuming rheostatic resistance is employed, or a rectifier in the alternating current circuit of which is arranged a choke coil, which latter produces a bad power factor in the feeding line, or a counter-compounded generator, the magnetic inertia of which in many cases necessitates costly special precautions.

According to the present invention considerable advantages in the size of the plant and in the consumption of energy are obtained by feeding the electric arc from a rectifier the tension of which is so regulated in automatic dependence on the electric arc conditions, i. e. on the electric arc current or on the electric arc tension by means of a grid arranged near the anode and having a potential influenced by the electric arc, that the arc burns in a stable manner. Different methods are known for regulating the direct tension yielded by a rectifier within wide limits by the application of a grid tension, as for example the methods hereinafter described, and depending on the particular method of regulation employed in the stabilization of the electric arc according to the present invention by automatic grid regulation.

In the accompanying drawings.

Fig. 3 diagrammatically illustrates an arrangement such as that described in the latter part of Example 1.

Fig. 4 shows an apparatus which serves to regulate the point of time at which the photo-cell is illuminated.

Fig. 5 illustrates an arrangement such as that described in the latter part of Example 2.

Figure 6:
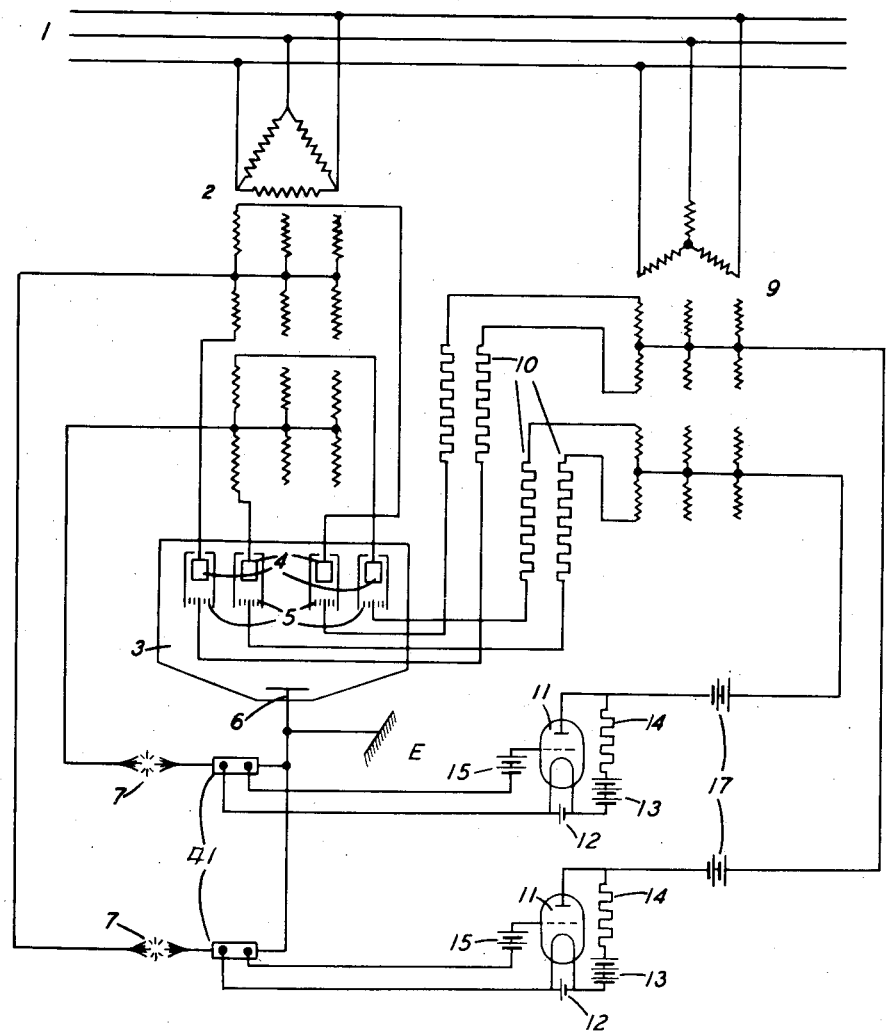

Fig. 6 illustrates diagrammatically an arrangement suitable for two electric arcs.

Fig. 7 illustrates diagrammatically an arrangement using a direct current generator for control purposes.

One method of regulating the voltage resides in that the ignition of a rectifier anode can only take place when the anode has a positive potential compared with the cathode and when moreover the grid concerned also has a positive potential which is greater than the so-called ignition voltage necessary for the ignition of the anode against the cathode. The attainment of the grid ignition tension and consequently the initiation of the ignition of the anode concerned at a certain point in time may be effected in known manner by causing a direct voltage with a superposed alternating voltage to serve as the grid voltage. When the total voltage is equal to the ignition voltage, the ignition of the anode takes place. By varying the direct tension, the point in time of the ignition may be displaced. By selection of the point in time of the ignition the duration of burning of the anode concerned during each period may be regulated and the mean voltage amplitude may be regulated during this duration of burning and thereby the direct voltage of the rectifier is regulated.

According to the present invention the direct voltage component of the grid voltage is automatically regulated by the electric arc current or by the electric arc voltage so that the arc burns in a stable manner. It is well known that the condition for stability is that each accidental increase in current or decrease in voltage of the arc immediately leads to a stronger decrease in the direct voltage than corresponds to the tendency of the arc characteristic and that each accidental decrease in current or increase in voltage of the arc immediately leads to a greater increase in the direct voltage than corresponds with the tendency of the arc characteristic. In the said kind of grid regulation this means that each increase in current and decrease in voltage of the arc must automatically lead to a decrease, and each decrease in current and increase in voltage of the arc to an increase in the grid direct voltage. If the arc voltage be used as the regulating factor the regulation of the grid voltage may be effected in such a manner that a part of the electric arc voltage serves for regulating the grid voltage of an electron tube the anode voltage of which is rendered variable within wide limits by the insertion of a sufficiently high resistance in the anode circuit and is used as direct voltage component of the regulating voltage of the rectifier. In such an arrangement which is described in Example 1, also the current variation of the arc may be made use of by connecting with the arc a powerful choke coil which has the effect that each decrease in current is accompanied by a short additional increase in voltage which strengthens the regulating impulse. The same applies with an increase in current. The regulation may also be taken only from the current, for example by using its voltage decrease in a resistance for regulating an electron tube which in the same or a similar manner as in Example 1 serves for regulating the rectifier grid voltage, or by causing the electric arc current or a part thereof to excite a regulating generator the voltage of which serves as the regulating voltage or as part of the regulating voltage of the rectifier.

It has been further found that the said arrangement may be employed with advantage also in the operation of several electric arcs. It is already known that in the simultaneous operation of several direct current electric arcs, the electric plant from which the electric arcs are fed has to be subdivided so that the voltage of each electric arc can assume any value without the electric arcs being mutually influenced. This requirement usually leads to entirely separate electric plants for each electric arc. In rectifier operation with choke coils in the threephase current circuit, by special arrangement a common rectifier may be used, while the employment of a common rectifier transformer leads to uneconomic special constructions.

According to the present invention, however, with the arrangement hereinbefore described two or more electric arcs not mutually influencing themselves may be simultaneously operated while employing a common rectifier as shown in the arrangement illustrated in Figure 6 of the accompanying drawings. In this case the electric arcs are stabilized without the usual means of controlling, such as rheostatic resistances, consuming energy, being necessary; for this purpose for each electric arc a special group of rectifier anodes must be arranged the ignition of which is regulated for each anode separate from the electric arc according to one of the methods hereinbefore described. This arrangement allows of feeding the common rectifier with only one transformer. Since the electric arc voltage is regulated by the ignition of the anodes, the special assignment of the anodes to each electric arc is sufficient for maintaining the simultaneous operation of several arcs. Precautions must be made for the separate supply of current between rectifier anodes and electric arcs, and this is effected for example either by separately connecting the secondary polyphase windings of the rectifier transformer with each arc to be fed from these windings. The separate connection of the secondary windings of the transformers can be directly taken out from the usual transformer arrangement feeding from an increased number of secondary windings an increased number of the anodes of the rectifier, and in which the secondary windings are so arranged as to form at least two separate groups.

The electric arcs thus produced are eminently suitable for carrying out chemical reactions, as for example the production of acetylene from other hydrocarbons.

The following examples, given with reference to the accompanying drawings which illustrate arrangements of apparatus according to this invention, will further illustrate the nature of this invention but the invention is restricted neither to these examples nor to the particular arrangements shown.

*Example 1*

Figure 1:
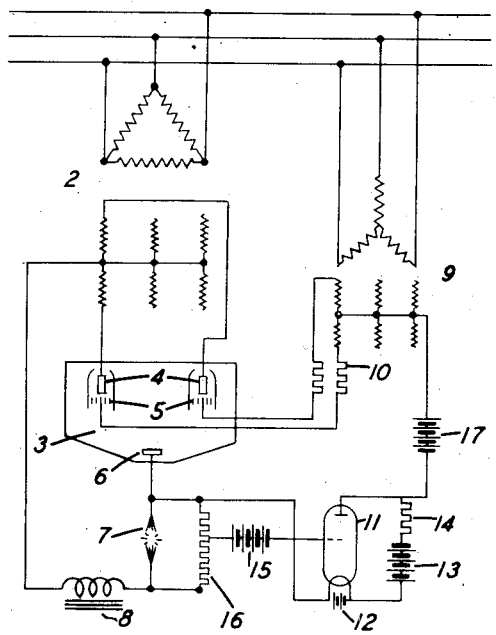
Fig. 1 is a wiring diagram showing an electric arc plant fed by a rectifier, the electric arc plant stabilized by grid regulation in dependence on the electric arc voltage.

Figure 1 is a wiring diagram showing an electric arc plant fed by a rectifier, the electric arc plant being stabilized by grid regulation in dependence on the electric arc voltage. 1 is the threephase current net to which is connected a rectifier transformer 2 from the secondary sixphase winding of which the rectifier 3 is fed. Of the six anodes only two anodes 4 are shown in the surroundings of which are arranged the regulating grids 5. The rectifier cathode 6 is connected to the anode of the electric arc 7 the cathode of which is connected with the zero point of the secondary winding of the transformer. A choke coil 8 may be arranged in the direct current circuit. The control grids 5 have applied thereto from a transformer 9 by way of resistance 10 an alternating potential the phase position of which relatively to the phase of the anode voltage may be regulated by suitable arrangement of the transformer 9. The value of the direct voltage on which the alternating voltage is superimposed is determined and regulated by the voltage of the anode of the electron tube 11. This voltage again is equal to the sum of the voltage of the heating battery 12 and the anode battery 13 minus the drop of voltage across the resistance 14 caused by the anode current in valve 11. The regulating direct voltage thus varies with the anode current of the vacuum tube and is higher the lower the anode current. The latter is regulated by the grid potential which is composed of a constant positive voltage of the battery 15 and a negative voltage proportional to the voltage of the electric arc tapped of a potentiometer resistance 16. This arrangement thus has the effect that an increase in the negative electric arc voltage is converted into an increase in the positive regulating direct voltage of the rectifier regulating grid. The battery 17 also renders possible a negative regulating direct voltage.

Figure 2:
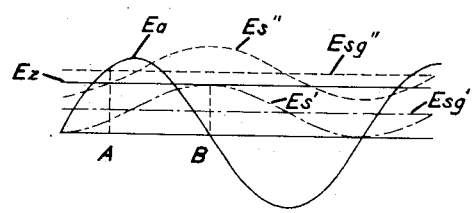
Fig. 2 shows the way known per se in which the variation of the component of the grid direct voltage influences the ignition point and thereby the rectifier voltage.

For the purpose of a more complete understanding, Figure 2 shows the way known per se in which the variation of the component of grid direct voltage influences the ignition point and thereby the rectifier voltage. $E_a$ is the anode voltage, $E_z$ the ignition voltage of the grid, $E_s'$ and $E_s''$ are two different regulating voltages for different values of direct voltage component $E_{sg}'$ and $E_{sg}''$. The ignition takes place when $E_s$ attains the value of the ignition voltage $E_z$. When the regulating voltage is equal to $E_s'$, it attains the value $E_z$ only at the time B, at this time, however the anode voltage $E_a$ is zero so that no ignition takes place and the direct voltage yielded by the rectifier is thus zero. If the regulating direct voltage $E_{sg}$ is raised the point of interaction of $E_s$ and $E_z$ returns to the left, the ignition takes place earlier and when $E_s$ is equal to $E_s''$ takes place at the time A. The anode then burns during the period of time from A to B from which the effective active anode voltage is obtained.

Another known method of initiating the ignition of the rectifier arc consists in keeping the regulating grid in general at negative potential and periodically bringing it to a positive potential of sufficient height for a short period of time. The ignition takes place at the moment of changing to positive potential. By means of a contact maker running synchronously with the net frequency, the periodic change may be caused and the ignition effected and regulated thereby.

With this arrangement it is necessary for carrying out the automatic stabilization of an electric arc that the point in time when the grid voltage is applied should be regulated without retardation by the electric arc current or by the electric arc voltage, and this may be effected in various ways. The synchronously rotating contact lever may be allowed to slide over a movable drum or disc which has a number of contacts corresponding to the number of anodes and which moves angularly under the action of the electric arc current or voltage and thereby alters the point in time of the making of the contact. In order to avoid mass inertia as far as possible, these parts must be small and light and are preferably used only for the actuation of relays. In the case of sensitive electric arcs it may be necessary still further to avoid inertia effects. In this case, the inertialess or practically inertialess regulation of the grid voltage may be obtained by optically actuated relays, as for example by means of photo-cells, whereby the point in time of the optical actuation of the relays may be influenced by means of a disc provided with slots or a mirror or mirror system which is turned in depedence on the electric arc current or electric arc voltage, the optical relay being illuminated earlier or later by a rotating ray of light thereby. This principle may be applied while using the inertialess relay action of electron tubes for example in that the regulating voltage consists of the anode voltage of an electron tube which, by a sufficiently high resistance in the anode circuit, is variable within wide limits, the grid voltage of the electron tube being so changed with the aid of an optically, mechanically or electrically actuated relay, that the anode voltage, at the actuation of the relay, immediately rises to the ignition voltage of the regulating grid of the rectifier.

*Example 2*

An arrangement such as that described in the latter part of Example 1 is illustrated diagrammatically in Figure 3. The six-anode rectifier 3 is fed from the threephase current net 1 by way of a rectifier transformer 2. Two of the anodes 4 are shown in the surroundings of which are arranged grids 5. The electric arc 7 is fed from the cathode 6. Since the voltages applied to the two anodes 4 shown are displaced in phase by about 180°, the grids appertaining to these anodes may be brought simultaneously to ignition voltage and then only the anode having a positive voltage will be ignited. The potential of the grids 5 compared with the cathode 6 is equal to the anode potential of the electron tube 8, which results from the voltages of the batteries 9, 11 and 12 reduced by the fall in voltage of the anode current in the resistance 13. The battery 9 brings the entire regulating arrangement to a negative potential basis compared with the cathode 6, 11 serves for heating the tube 8, 12 gives a positive potential to the tube anode 8 as long as no anode current or only a slight anode current flows. The resistance 13 is so dimensioned that with sufficiently great anode current, the anode potential becomes negative compared with the rectifier cathode 6. The anode current of the tube 8 is regulated by its grid potential which results from the voltages of the batteries 9 and 10 and the resistance ratio of the resistance 14 and the photo-cell 15. Resistances and voltages are adjusted as follows: When the photo-cell 15 is not illuminated, the grid of the tube 8 has so high a potential that an anode current flows and this causes a fall in potential in the resistance 13 sufficient to force the potential of the anode of the rectifier to a negative value compared with the cathode 6. As soon as the photo-cell 15 is illuminated its resistance falls considerably, the grid potential becomes strongly negative and the anode current falls so much that the anode grids 5 become sufficiently positive to cause ignition. The anodes 4 are therefore ignited as soon as the photo-cell 15 is illuminated.

The point in time at which the photo-cell is illuminated may be regulated by an apparatus as shown in Figure 4. A source of light 2, driven by a synchronous motor 1, rotates synchronously with the threephase current circuit feeding the rectifier. This source of light throws a small vertical strip of light onto a conical mirror 3 in such manner that it is reflected vertically downwards and strikes in the form of a radial line, a disc 4 provided with slots. The arrangement of the slots may be seen from the plan view; they allow the ray of light to fall at uniform intervals on the three photo-cells 5 the light-sensitive layers of which are arranged in the form of concentric rings. On the axis of the disc is arranged a conductor loop 6 through which flows a part of the electric arc current and which moves in the field of a permanent magnet 7. The disc is turned by the electrodynamic action of the current against the action of a regulatable spring 8 and consequently the point in time at which the illumination of the photo-cells takes place is varied. The greater the electric arc current, the greater is the distance through which the disc 4 is turned in the direction of rotation of the ray of light and therefore the later in each period the illumination of each cell and consequently the ignition of each anode occurs. In a similar manner reduction in the current leads to earlier ignition. The conductor loop 6 may also be fed by a current proportional to the electric arc voltage.

Instead of initiating the ignition by a positive direct voltage on the control grid, an alternating voltage of sufficiently high frequency may be imposed on the grid, the positive half waves of which initiate the ignition. Such a voltage may be induced in a transformer the primary winding of which lies in the anode circuit of an electron tube, the grid voltage of which consists of a transformer-induced alternating voltage of high frequency and a direct voltage, which is so changed by means of an optically actuated relay that the electron tube works either in a very insensitive, flat portion, or in a very sensitive, steep portion of its characteristic according to the height of the said direct voltage.

*Example 3*

An arrangement such as that described in the latter part of Example 2 is illustrated in Figure 5. The main parts of the apparatus are the same as in the foregoing examples, viz: 1 is the threephase current net, 2 the rectifier transformer, 3 the rectifier, 4 the anodes, 5 the control grids, 6 the cathode and 7 the electric arc. The potential of the control grid results from the sum of the negative direct voltage of the battery 9 and the alternating voltage of high frequency which is provided by the transformer 10. With the introduction of the high frequency alternating voltage ignition takes place. The primary winding of the transformer 10 is arranged between the anode battery 11 and the anode of the amplifying tube 8, and the alternating current flowing therethrough is determined by the grid voltage of the tube 8. The grid voltage is composed by a high frequency alternating voltage induced by the transformer 12, and a direct voltage which results from the co-action of the batteries 13 and 14, the photo-cell 15 and the resistance 16. These are so selected that when the photo-cell is not illuminated the direct voltage on the grid is so strongly negative that the tube practically ceases to respond to the alternating voltage imposed on the grid; when the photo-cell is illuminated, the grid voltage increases so that the tube works in the steepest portion of its characteristic and the grid alternating voltage is amplified. Illumination of the photo-cell leads to immediate ignition of the rectifier anode. The automatic regulation of the point in time at which ignition takes place in dependence on the factors determining the electric arc may be effected by the arrangement hereinbefore described with reference to Figure 4.

*Example 4*

Figure 6 illustrates diagrammatically an arrangement suitable for two electric arcs. A rectifier transformer 2 is fed from a three phase current net 1 and contains two six phase secondary windings which are electrically separate. Each of the twelve ends of the double six-phase winding is connected with an anode in a twelve-anode rectifier 3. The drawings show only four of these anodes 4; each anode is provided with a control grid 5. From the cathode 6 of the rectifier separate conductors are led to the two electric arcs 7 and from thence to the star points of the two secondary windings of the transformer 2. Between the rectifier cathode 6 and the electric arcs 7 are interposed ohmic resistances 8 the voltage across which serves for controlling the ignition of the rectifier anodes 4. The regulating arrangement consists of a transformer 9 which may be common to all the electric arcs. It has a number of electrically separate secondary windings corresponding to the number of electric arcs; in the present case, similarly to the rectifier transformer, it has two six-phase windings the ends of which are connected by suitable resistances 10 with the corresponding regulating grids 5 of the rectifier. While the transformer 9 yields the alternating current part of the regulating voltages, the direct current part is determined, as described in Example 1, by the potential of the anodes of the electron tubes 11 which are arranged separately for each electric arc and the grid voltage of which is determined by the voltage across the resistances 8. The method of operation of the electric tube arrangement, the appropriate batteries 12, 13, 15 and 17 and the resistances 14 is exactly the same as described in Example 1.

Fig. 7 illustrates an arrangement similar to Fig. 1, but using a direct current generator for obtaining the control voltage. In this figure a direct current generator 20 is provided with an exciting winding 21, which is connected across a resistance 8 in series with the arc 7, so that at least a part of the electric arc current serves as exciting current for the generator. The armature 22 of the generator is connected between the mid-point of the secondary of the transformer 9 and the cathode 6 of the rectifier, so that the generator supplies at least a part of the direct voltage component to the grid of the rectifier.

What we claim is:

1. An apparatus for operating direct current electric arcs, which comprises electrodes for such arcs, a rectifier, an alternating current source connected with the said electrodes by way of said rectifier, means for controlling the voltage of said rectifier in automatic dependency on the instantaneously electric arc conditions as to cause stability of the electric arc, said means comprising a grid near the anodes of said rectifier, means for imparting to said grid a voltage being the sum of an alternating voltage component and a direct voltage component, a thermionic valve connected with the electric arc circuit in such a manner that the electrical conditions of the arc cause the control of the grid voltage of said thermionic valve, a resistance connected with the anode current circuit of the said thermionic valve whereby the anode voltage thereof becomes variable in wide limits, the last mention anode being connected with the grid of said rectifier imparting thereto said direct voltage component.

2. An apparatus for operating direct current electric arcs, which comprises electrodes for such arcs, a rectifier, an alternating current source connected with the said electrodes by way of said rectifier, means for controlling the voltage of said rectifier in automatic dependency on the instantaneous electric arc conditions as to cause stability of the electric arc, said means comprising a grid near the anodes of said rectifier, means for imparting to said grid a voltage being the sum of an alternating voltage component and a direct voltage component, a direct current generator the exciter part of which is connected with the electric arc circuit in such a manner that at least part of the electric arc current serves as exciting current of the said generator, the armature of the said generator being connected with the said grid in such a manner that the voltage of the armature yields at least part of the direct voltage component of the controlling voltage of the aforesaid rectifier.

3. An apparatus for operating direct current electric arcs, which comprises electrodes for such arcs, a rectifier, an alternating current source connected with said electrodes by way of said rectifier, means for controlling the voltage of said rectifier in automatic dependency on the instantaneous electric arc conditions as to cause stability of the electric arc, said means comprising a grid near the anodes of said rectifier, means for applying periodically for short periods of time a voltage to said grid, means for controlling the moment and time intervals for applying the said voltage in dependency on the instantaneous electric arc conditions, a transformer, the primary winding of which is connected with the anode circuit of a thermionic valve, the grid voltage of the said thermionic valve being the sum of an alternating voltage induced by another transformer and of a direct voltage and a relay capable of varying the amount of the said direct voltage, influencing thereby the sensibility of the said thermionic valve.

4. An apparatus for operating direct current electric arcs, which comprises electrodes for sucn arcs, a rectifier, an alternating current source connected with the said electrodes by way of said rectifier, means for controlling the voltage of said rectifier in automatic dependency on the instantaneous electric arc conditions as to cause stability of the electric arc, said means comprising grids near the anodes of the said rectifier, means for applying periodically for short periods of time a voltage to the said grids and means for controlling the moment and time intervals for applying the said voltage in dependency on the instantaneous electric arc conditions, the grids near each couple of anodes the voltages of which are in phase opposition to one another being controlled by the same controlling means.

5. An apparatus for operating direct current electric arcs for treating hydrocarbons, which comprises electrodes for such arcs, a rectifier, an alternating current source connected with the said electrodes by way of said rectifier, means for controlling the voltage of said rectifier in automatic dependency on the instantaneous electric arc conditions so as to cause stability of the electric arc, said means comprising a grid near the anodes of said rectifier, means for imparting to said grid a voltage being the sum of an alternating voltage component and a direct voltage component, a thermionic valve connected with the electric arc circuit in such a manner that part of the electric arc voltage causes the control of the grid voltage of said thermionic valve, a high resistance connected with the anode current circuit of the said thermionic valve whereby the anode voltage thereof becomes variable in wide limits, the last mentioned anode being connected with the grid of said rectifier imparting thereto said direct voltage component.

PAUL BAUMANN.
KARL KRAPP.
HEINRICH SCHILLING.
ROBERT STADLER.